(12) United States Patent
Moriya et al.

(10) Patent No.: US 11,529,880 B2
(45) Date of Patent: Dec. 20, 2022

(54) ELECTRIC VEHICLE AND CHARGE CONTROL APPARATUS FOR ELECTRIC VEHICLE

(71) Applicant: SUBARU CORPORATION, Tokyo (JP)

(72) Inventors: Fumiyuki Moriya, Tokyo (JP); Yuta Totsuka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 380 days.

(21) Appl. No.: 16/841,370

(22) Filed: Apr. 6, 2020

(65) Prior Publication Data

US 2021/0016669 A1    Jan. 21, 2021

(30) Foreign Application Priority Data

Jul. 18, 2019    (JP) .............................. JP2019-132343

(51) Int. Cl.
*H02J 7/00*    (2006.01)
*B60L 53/124*    (2019.01)
*B60L 53/60*    (2019.01)

(52) U.S. Cl.
CPC ............. *B60L 53/124* (2019.02); *B60L 53/60* (2019.02); *B60L 2210/10* (2013.01); *B60L 2210/30* (2013.01); *B60L 2210/40* (2013.01)

(58) Field of Classification Search
USPC ................................................. 320/108, 109
See application file for complete search history.

(56) References Cited

U.S. PATENT DOCUMENTS

| 2012/0200151 | A1* | 8/2012 | Obayashi | B60L 53/305 307/104 |
| 2013/0038285 | A1* | 2/2013 | Hickox | H02J 50/90 320/109 |
| 2014/0239891 | A1* | 8/2014 | Martin | B60L 53/124 320/108 |
| 2015/0278038 | A1* | 10/2015 | Halker | B60L 53/122 714/3 |
| 2016/0052403 | A1* | 2/2016 | Asai | H02J 50/90 307/10.1 |

FOREIGN PATENT DOCUMENTS

JP    2013-223397 A    10/2013

* cited by examiner

*Primary Examiner* — Samuel Berhanu
(74) *Attorney, Agent, or Firm* — McGinn I.P. Law Group, PLLC.

(57) ABSTRACT

An electric vehicle includes a power receiver and a controller. The power receiver is configured to wirelessly receive electric power from power transmission equipment disposed outside the vehicle. The controller is configured to control power transmission from the power transmission equipment to the power receiver. The controller includes a determination processor and a frequency control unit. The determination processor is configured to make a determination, in a case where the power transmission is stopped due to a foreign object present between the power transmission equipment and the vehicle, as to whether the power transmission is restartable with a predetermined frequency after the power transmission is stopped. The frequency control unit is configured to change the frequency with which the determination processor makes the determination.

18 Claims, 4 Drawing Sheets

ELECTRIC VEHICLE AND CHARGE CONTROL APPARATUS FOR ELECTRIC VEHICLE

CROSS-REFERENCE TO RELATED APPLICATIONS

The present application claims priority from Japanese Patent Application No. 2019-132343 filed on Jul. 18, 2019, the entire contents of which are hereby incorporated by reference.

BACKGROUND

The disclosure relates to an electric vehicle and a charge control apparatus for an electric vehicle.

There is a technique of wirelessly transmitting electric power from a power transmitter of ground equipment to a power receiver of an electric vehicle, to charge a battery provided in the electric vehicle with the received electric power. Such a charging mode is referred to as "wireless charging". Japanese Unexamined Patent Application Publication No. 2013-223397 discloses a technique of stopping the wireless charging in a case where a foreign object is present near the electric power transmitter during the wireless charging, and thereafter restarting the wireless charging in a case where the foreign object is removed.

SUMMARY

An aspect of the technology provides an electric vehicle that includes a power receiver and a controller. The power receiver is configured to wirelessly receive electric power from power transmission equipment disposed outside the vehicle. The controller is configured to control power transmission from the power transmission equipment to the power receiver. The controller includes a determination processor and a frequency control unit. The determination processor is configured to make a determination, in a case where the power transmission is stopped due to a foreign object present between the power transmission equipment and the vehicle, as to whether the power transmission is restartable with a predetermined frequency after the power transmission is stopped. The frequency control unit is configured to change the frequency with which the determination processor makes the determination.

An aspect of the technology provides a charge control apparatus for an electric vehicle. The charge control apparatus includes a power receiver and circuitry. The power receiver is configured to wirelessly receive electric power from a power transmission equipment disposed outside the vehicle. The power receiver is configured to charge a battery with the received electric power. The circuitry is configured to control power transmission from the power transmission equipment to the power receiver. The circuitry is configured to make a determination, in a case where the power transmission is stopped due to a foreign object present between the power transmission equipment and the vehicle, as to whether the power transmission is restartable with a predetermined frequency after the power transmission is stopped. The circuitry is configured to change the frequency of making the determination.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
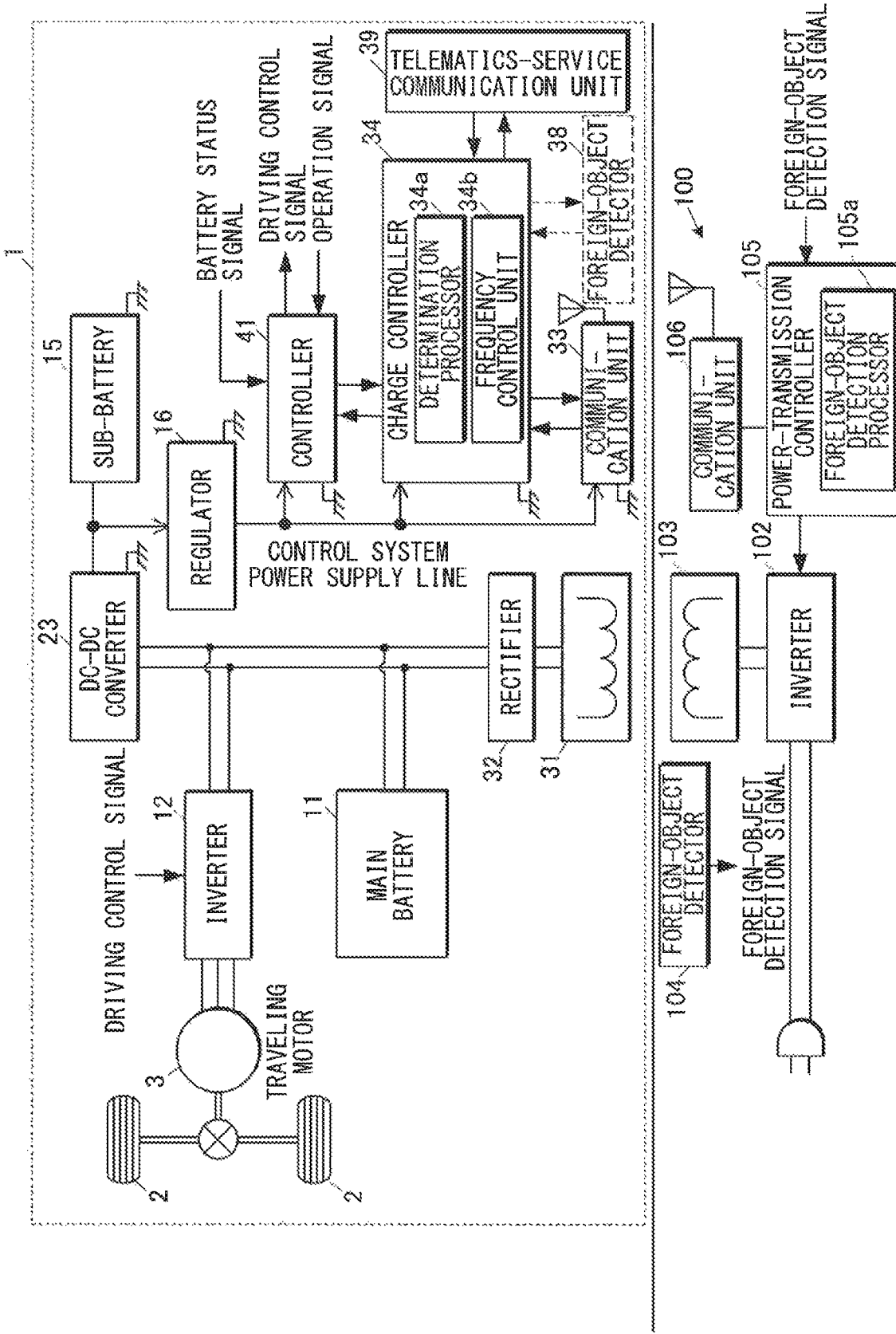
FIG. 1 is a block diagram illustrating examples of an overall configuration of an electric vehicle and ground equipment according to one embodiment of the technology.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

First Example Embodiment

FIG. 1 is a block diagram illustrating an overall configuration of an electric vehicle 1 according to a first example embodiment of the disclosure. The electric vehicle 1 and ground equipment according to the first example embodiment may be an electric vehicle (EV) or a hybrid electric vehicle (HEV) having a wireless charging function. The electric vehicle 1 may include driving wheels 2, an electric motor 3, a battery 11, an inverter 12, a power receiver 31, a rectifier 32, a sub-battery 15, a DC-DC converter 23, a regulator 16, a controller 41, a charge controller 34, a communication unit 33, and a telematics-service communication unit 39. The electric motor 3 may generate power to be transmitted to the driving wheels 2. The electric motor 3 is hereinafter referred to as a "traveling motor 3". The battery 11 may store electric power to be fed to the traveling motor 3. The battery 11 is hereinafter referred to as a "main battery 11". The inverter 12 may convert DC power outputted from the battery 11 to AC power and feed the AC power to the traveling motor 3. The power receiver 31 may wirelessly receive electric power by an electromagnetic action from ground equipment 100 disposed outside the electric vehicle 1. The rectifier 32 may rectify the electric power received by the power receiver 31 and feed the rectified power to the main battery 11 and the inverter 12. The sub-battery 15 may store electric power to be fed to a device other than the traveling motor 3. The DC-DC converter 23 may convert output electric power from the main battery 11 into electric power for a device. The regulator 16 may generate a power supply voltage of a control system from output electric power from the sub-battery 15. The controller 41 may perform traveling control and control each unit of the electric vehicle 1. The charge controller 34 may control wireless charging. The communication unit 33 may communicate with the ground equipment 100 at a time of the wireless charging. The telematics-service communication unit 39 may communicate with a user's mobile terminal via a telematics service. The user may be, for example, a driver of the electric vehicle 1.

The ground equipment 100 may be power transmission equipment that wirelessly transmits electric power to the electric vehicle 1. The ground equipment 100 may include a power transmitter 103, an inverter 102, a communication unit 106, a power-transmission controller 105, and a foreign object detector 104. The power transmitter 103 may wirelessly transmit electric power by an electromagnetic action to the power receiver 31 of the electric vehicle 1. The inverter 102 may receive electric power from a commercial power source or the like and feed an AC current to the power transmitter 103. The communication unit 106 may communicate with the electric vehicle 1 during the wireless charging. The power-transmission controller 105 may drive the inverter 102 to control the power transmission from the power transmitter 103. The foreign object detector 104 may detect the foreign object which is present near the power transmitter 103 while the wireless power transmission is stopped. The foreign object detector 104 may have any configuration as long as the foreign object detector 104 is able to detect a foreign object in a state where a magnetic field is not generated by the power transmitter 103. The foreign object detector 104 may have, for example but not limited to, a configuration allowing for image capturing and image recognition of the foreign object using a captured image, or a configuration using radar such as ultrasonic radar or optical radar.

The main battery 11 may be, for example, a lithium-ion secondary battery or a nickel-metal hydride secondary battery. The main battery 11 may be rated to output a sufficiently high voltage to drive the traveling motor 3, and may be considered as a high-voltage battery in the first example embodiment. In one example, the main battery 11 may be coupled to a high voltage power supply line via a relay that is opened and closed by the controller 41.

The sub-battery 15 may be, for example, a lead-acid battery. The sub-battery 15 may store electric power to be fed to a device other than the traveling motor 3. The sub-battery 15 may output a power supply voltage lower than the output voltage of the main battery 11 in the first example embodiment. For example, the sub-battery 15 may output the power supply voltage of 12 V.

Non-limiting examples of each of the power receiver 31 and the power transmitter 103 may include a coil that wirelessly transmits electric power through electromagnetic induction or electromagnetic resonance. Outputting an alternating current to the power transmitter 103 while the power receiver 31 and the power transmitter 103 are aligned with each other may generate alternating-current electromotive force in the power receiver 31.

The controller 41 may receive an operation signal of driving operation performed by a passenger and drive a device such as the inverter 12 on the basis of the operation signal to control a traveling state of the electric vehicle 1. The passenger may be a user such as a driver of the electric vehicle 1. The controller 41 may include a battery managing unit that manages state information of the main battery 11. The battery managing unit may receive a state signal of the main battery 11, and manage a state of charge (SOC) or any other state information of the main battery 11. Non-limiting examples of the state signal may include a signal indicating a discharging current, a signal indicating a charging current, a signal indicating a voltage, and a signal indicating a temperature. The controller 41 may provide the state information of the main battery 11 to the charge controller 34 at a time of the wireless charging. The state information which the controller 41 provides may include information that may be necessary for calculating electric power requested for charging the main battery 11. Non-limiting examples of the information that may be necessary for calculating electric power requested for charging the main battery 11 may include the state of charge, a temperature, and an input limit of electric power. Further, the controller 41 may receive an operation signal of a wireless charging start button operable by the passenger, and perform a wireless charging process in association with the charge controller 34. The controller 41 may include a single electronic control unit (ECU), or may include a plurality of ECUs that communicate with each other and operate in association with each other.

The charge controller 34 may control the wireless charging while communicating with the ground equipment 100 via the communication unit 33. The charge controller 34 may include, for example but not limited to, a determination processor 34a and a frequency control unit 34b. The determination processor 34a may perform a determination process, i.e., a process of determining, in a case where the wireless charging (wireless power transmission) is stopped due to detection of a foreign object, whether the wireless charging is restartable as a result of removal of the foreign object. The frequency control unit 34b may set a frequency with which the determination processor 34a performs the determination process. The charge controller 34 may include a single ECU, or may include a plurality of ECUs that communicate with each other and operate in association with each other. An ECU that serves as the charge controller 34 does not have to be different from an ECU that serves as the controller 41. In one example, a common ECU may achieve all or a portion of operation of the charge controller 34 and all or a portion of operation of the controller 41. The determination processor 34a and the frequency control unit 34b may each be, for example but not limited to, a functional module that is achieved by execution of a control program by a central processing unit (CPU) in an ECU.

In one embodiment, the power receiver 31 may serve as a "power receiver". In one embodiment, the controller 41 and the charge controller 34 may serve as a "controller". In one embodiment, the determination processor 34a may serve as a "determination processor". In one embodiment, the frequency control unit 34b may serve as a "frequency control unit". In one embodiment, the communication unit 33 may serve as a "communication unit". In one embodiment, the telematics-service communication unit 39 may serve as a "request input unit". In one embodiment, the charge controller 34 that may receive a notification of presence of a foreign object and information regarding a type of the foreign object from the power-transmission controller 105 or a foreign-object detection processor 105a may serve as a "foreign object detector" and may also serve as a "type determination unit". In the first example embodiment, a plurality of units, i.e., the controller 41 and the charge controller 34 may serve as the "controller"; however, the technology is not limited thereto. In one example embodiment, a single unit such as the charge controller 34 may serve as the "controller". In contrast, a configuration exemplified as a single unit may be divided into a plurality of units, and the plurality of units may be configured to operate in association with each other. In one example embodiment, a unit serving as the "foreign object detector" and a unit serving as the "type determination unit" may be different from each other. In addition, a dedicated unit may serve as each of the "foreign object detector" and the "type determination unit". For example, a foreign object detector 38 of the electric vehicle 1 which will be described later may serve as the "foreign object detector" in another example embodiment.

[Wireless Charging Process]

Figure 2:
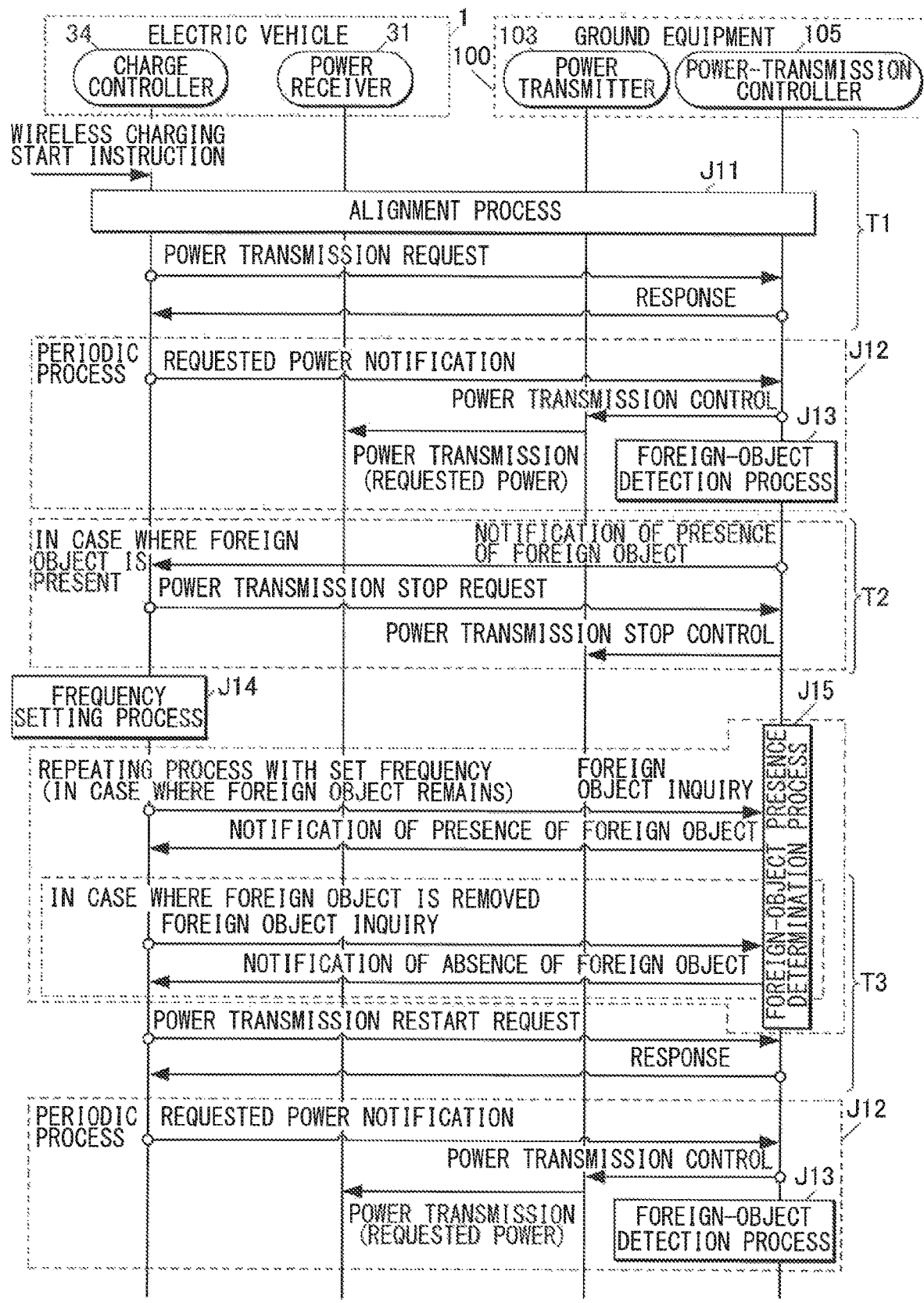
FIG. 2 is a sequence diagram illustrating an example of a flow of a wireless charging process performed by the electric vehicle and the ground equipment according to the embodiment.

FIG. 2 is a sequence diagram illustrating a flow of a wireless charging process performed by the electric vehicle and the ground equipment according to the first example embodiment.

The charge controller 34 may control the wireless charging in association with the power-transmission controller 105 through communication. As illustrated in a start period T1 in FIG. 2, the charge controller 34 may first perform an alignment process J11 of the electric vehicle 1 when receiving a wireless charging start instruction from the controller 41 on the basis of wireless charging starting operation performed by a user. In the alignment process J11, the power transmitter 103 may be weakly excited, and the charge controller 34 may assist the traveling of the electric vehicle 1 while measuring the electromotive force of the power receiver 31. The user may move the electric vehicle 1 in accordance with the traveling assist. In this way, the power receiver 31 may be aligned with the power transmitter 103. The alignment may cause the power receiver 31 to generate an electromotive force of a predetermined value or more through an electromagnetic action of the weakly excited power transmitter 103. The charge controller 34 may thereby determine the completion of the alignment on the basis of the electromotive force.

In response to the completion of the alignment process J11 in the start period T1, the charge controller 34 may send a power transmission request to the power-transmission controller 105 via wireless communication by the communication units 33 and 106. If power transmission is available, the power-transmission controller 105 may send an affirmative response. The process then may proceed to a periodic process J12 in which power transmission is actually performed.

In the periodic process J12, the charge controller 34 may calculate appropriate charging electric power on the basis of the state information of the main battery 11, and notify the power-transmission controller 105 of requested electric power. The power-transmission controller 105 may so cause an electric current to flow into the power transmitter 103 via the inverter 102 that the requested electric power is transmitted, thereby wirelessly transmitting the electric power to the power receiver 31. The rectifier 32 may rectify the transmitted electric power and supply the rectified electric power to the main battery 11.

In the periodic process J12, the foreign-object detection processor 105a of the power-transmission controller 105 may perform a foreign-object detection process J13. In the foreign-object detection process J13, for example, the power-transmission controller 105 may receive information regarding an amount of received electric power from the charge controller 34, and the foreign-object detection processor 105a may determine whether a foreign object is present on the basis of a difference between an amount of electric power transmitted by the power transmitter 103 and the amount of received electric power. In other words, the foreign-object detection processor 105a may detect presence of the foreign object. The foreign object may absorb a portion of the power wirelessly transmitted, and thereby reduces electric power to be transmitted to the power receiver 31 by an amount of the absorbed electric power. This allows for determination as to whether the foreign object is present based on the difference between the amount of transmitted electric power and the amount of received electric power. A method of detecting the foreign object used in the foreign-object detection process J13 is not limited to the above-described method. Various kinds of methods may be adopted in the foreign-object detection process J13 such as detection of variation in a magnetic field due to the foreign object, image recognition of the foreign object using a captured image, or detection using radar such as ultrasonic radar or optical radar, other than the method described above.

In a case where no foreign object is present, the periodic process J12 may be repeated, and the wireless charging of the main battery 11 may proceed.

In contrast, when a foreign object enters in a region near the power transmitter 103 and the presence of the foreign object is determined in the foreign-object detection process J13, the power-transmission controller 105 may notify the charge controller 34 of the presence of the foreign object as illustrated in a period T2 in FIG. 2. Further, the charge controller 34 may make an electric power transmission stop request to the power-transmission controller 105 on the basis of the notification. Thereafter, the power-transmission controller 105 may so perform, on the basis of the request, control that transmission of electric power is stopped, causing the transmission of the electric power from the power transmitter 103 to be stopped.

When the transmission of the electric power is stopped on the basis of the detection of the foreign object, the frequency control unit 34b of the charge controller 34 may first perform a frequency setting process J14. In the frequency setting process J14, the frequency control unit 34b may set a frequency with which the determination processor 34a performs the determination process, on the basis of a remaining electric power amount of the electric vehicle 1, the request from the user, the type of the foreign object, or a combination thereof. The remaining electric power amount of the electric vehicle 1 may include, for example but not limited to, a condition of a remaining charged power amount of the sub-battery 15, the main battery 11, or both. The frequency control unit 34b may include a state of the sub-battery 15 other than the remaining charged power amount as a factor to set the frequency. Non-limiting examples of the state of the sub-battery 15 other than the remaining charged power amount may include a voltage and a state of health (SOH). Details of the frequency setting process will be described later with reference to flowcharts illustrated in FIG. 3 to FIG. 6.

After the frequency is set, the determination processor 34a may make an inquiry about the foreign object to the power-transmission controller 105 with the set frequency in order to determine whether the wireless charging is restartable as a result of removal of the foreign object. The inquiry about the foreign object may be made by means of wireless communication via the communication unit 33. The charge controller 34 and the communication unit 33 may operate with electric power of the sub-battery 15. Therefore, the state of charge of the sub-battery 15 may decrease when the inquiry about the foreign object is repeated many times while the wireless charging is stopped.

In accordance with the inquiry about the foreign object, the power-transmission controller 105 may determine whether the foreign object is present with use of the foreign object detector 104 (J15). If the foreign object is not removed, the power-transmission controller 105 may notify the charge controller 34 of the presence of the foreign object in response to the inquiry. Such inquiry about the foreign object and such notification of the presence of the foreign object may be repeated until the foreign object is removed.

In contrast, in a case where the foreign object is removed, the power-transmission controller 105 may notify the charge controller 34 of absence of the foreign object as illustrated in a period T3 in FIG. 2. Accordingly, the charge controller 34 may stop repeating the inquiry about whether the foreign object is removed, and make an electric power transmission restart request to the power-transmission controller 105. Thereafter, if the power transmission is allowed, the power-transmission controller 105 may return an affirmative response to the charge controller 34, causing the wireless power transmission and charging of the main battery 11 to be restarted by the periodic process J12 described above.

[Frequency Setting Process]

Figure 3:
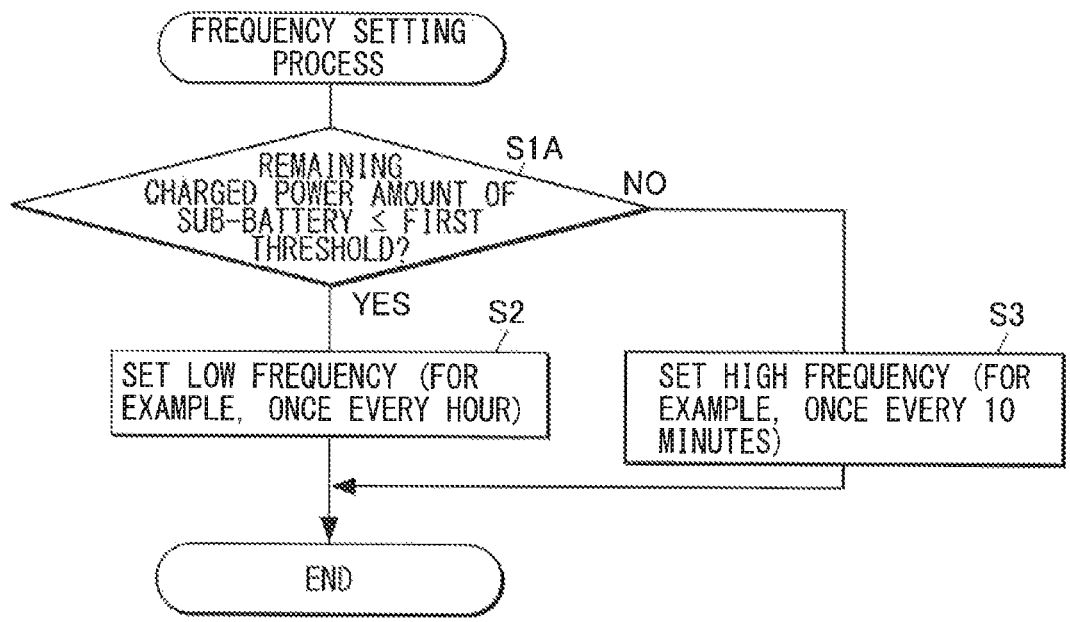
FIG. 3 is a flowchart illustrating a first example of a frequency setting process illustrated in FIG. 2.

Next, specific but non-limiting examples of the frequency setting process J14 illustrated in FIG. 2 will be described. FIG. 3 is a flowchart illustrating a first example of the frequency setting process illustrated in FIG. 2. In the first example, the frequency control unit 34b may set the frequency on the basis of the remaining charged power amount of the sub-battery 15. The frequency control unit 34b may set a high frequency if the remaining charged power amount is high, and the frequency control unit 34b may set a low frequency if the remaining charged power amount is low. In the first example embodiment, the remaining charged power amount may indicate the state of charge of the sub-battery 15. The remaining charged power amount may be, for example but not limited to, an actual charge level of the sub-battery 15 or a value obtained by dividing the actual charge level by a full charge level. The charge level of the sub-battery 15 may be calculated or estimated on the basis of a terminal voltage or an output voltage obtained when the sub-battery 15 is in an open-circuit state.

When the frequency setting process J14 in FIG. 2 is started, the frequency control unit 34b may determine whether the remaining charged power amount of the sub-battery 15 is equal to or less than a first threshold (step S1A). The first threshold may be set to a value indicating a possibility that the remaining charged power amount of the sub-battery 15 becomes insufficient due to consumption of electric power required to determine whether the foreign object is removed. Non-limiting example cases where the remaining charged power amount of the sub-battery 15 becomes insufficient may include exhaustion of electric power. If the remaining charged power amount is more than the first threshold (NO in step S1A), it may be determined that there is no possibility that the remaining charged power amount becomes insufficient. If the remaining charged power amount is equal to or less than the first threshold (YES in step S1A), it may be determined that there is the possibility that the remaining charged power amount becomes insufficient. When a result of the determination in step S1A is YES, the frequency control unit 34b may set the frequency to a low frequency (step S2), for example. Non-limiting examples of the low frequency may include a frequency of once every hour. In contrast, when the result of the determination in step S1A is NO, the frequency control unit 34b may set the frequency to a high frequency (step S3), for example. Non-limiting examples of the high frequency may include a frequency of once every ten minutes.

The frequency setting process illustrated in FIG. 3 may be effective in a case where the electric vehicle 1 has a system configured to be stopped and become non-restartable when the electric power of the sub-battery 15 is exhausted. According to the frequency setting process illustrated in FIG. 3, while the wireless charging is restartable in a case where the foreign object is removed, consumption of electric power of the sub-battery 15 is suppressed in a case where the remaining charged power amount of the sub-battery 15 is small, allowing for avoidance of exhaustion of the electric power of the sub-battery 15. It is to be noted that the frequency control unit 34b may determine whether there is a possibility of exhaustion of electric power on the basis of any other state such as a voltage or an SOH of the sub-battery 15, and set the frequency in a similar way on the basis of a result of the determination. Effects similar to those described above may be obtained also in this case.

Figure 4:
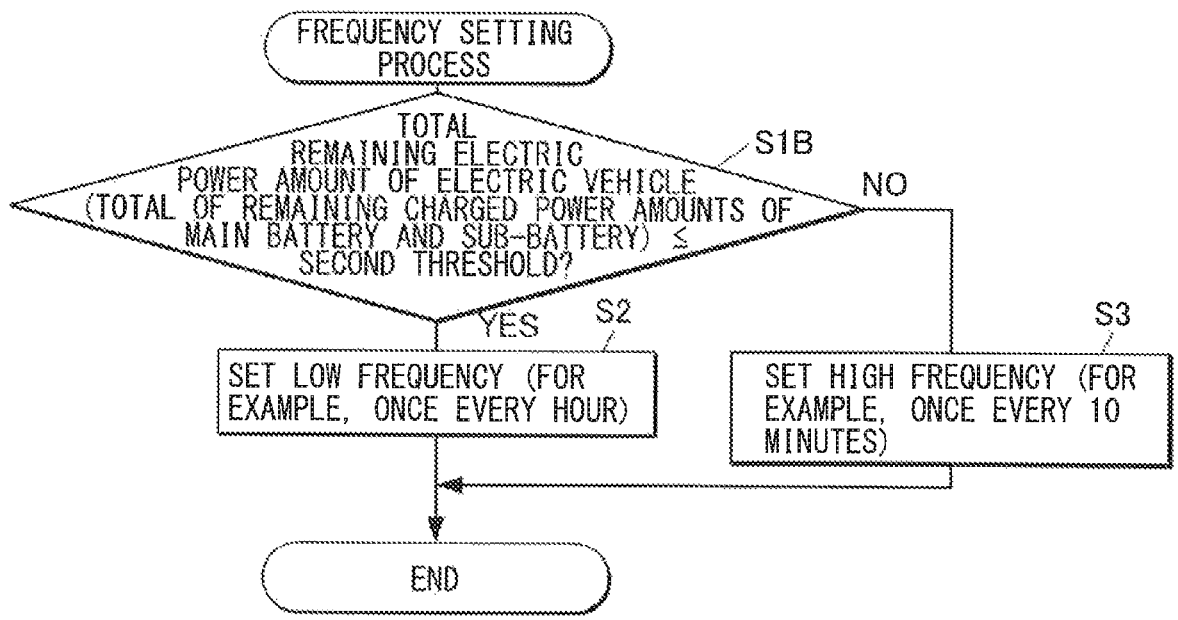
FIG. 4 is a flowchart illustrating a second example of the frequency setting process illustrated in FIG. 2.

FIG. 4 is a flowchart illustrating a second example of the frequency setting process illustrated in FIG. 2. In the second example, the frequency control unit 34b may set the frequency on the basis of a total of the remaining electric power amounts of the electric vehicle 1. The total of the remaining electric power amounts of the electric vehicle 1 may indicate a total amount of the remaining charged power amount of the main battery 11 and the remaining charged power amount of the sub-battery 15. The total of the remaining electric power amounts of the electric vehicle 1 is hereinafter referred to as a "total remaining electric power amount". The frequency control unit 34b may set a high frequency if the total remaining electric power amount is great, and the frequency control unit 34b may set a low frequency if the total remaining electric power amount is small.

When the frequency setting process 114 in FIG. 2 is started, the frequency control unit 34b may determine whether the total remaining electric power amount including the remaining charged power amount of the main battery 11 and the remaining charged power amount of the sub-battery 15 is equal to or less than a second threshold (step S1B). The second threshold may be set to a value indicating a possibility of exhaustion of electric power. When a result of the determination in step S1B is YES, the frequency control unit 34b may set the frequency to a low frequency (step S2), for example. Non-limiting examples of the low frequency may include a frequency of once every hour. In contrast, when the result of the determination in step S1B is NO, the frequency control unit 34b may set the frequency to a high frequency (step S3), for example. Non-limiting examples of the high frequency may include a frequency of once every ten minutes.

The frequency setting process illustrated in FIG. 4 may be effective in a case where the electric vehicle 1 has a system configured to allow for transmission of the electric power of the main battery 11 to the sub-battery 15 by a device such as the DC-DC converter 23 at the time of the wireless charging or to allow for using the electric power of the main battery 11 for operation of the control system at the time of the wireless charging. According to the frequency setting process illustrated in FIG. 4, while the wireless charging is restartable in a case where the foreign object is removed, it is possible to avoid exhaustion of the electric power of the electric vehicle 1 which makes the system non-restartable in a case where the total remaining electric power amount of the electric vehicle 1 is small. The frequency control unit 34*b* may determine whether there is the possibility of exhaustion of electric power on the basis of any other state such as a voltage or an SOH of the sub-battery 15, and set the frequency in a similar way on the basis of a result of the determination, also in the second example illustrated in FIG. 4. Effects similar to those described above may be obtained also in this case.

Figure 5:
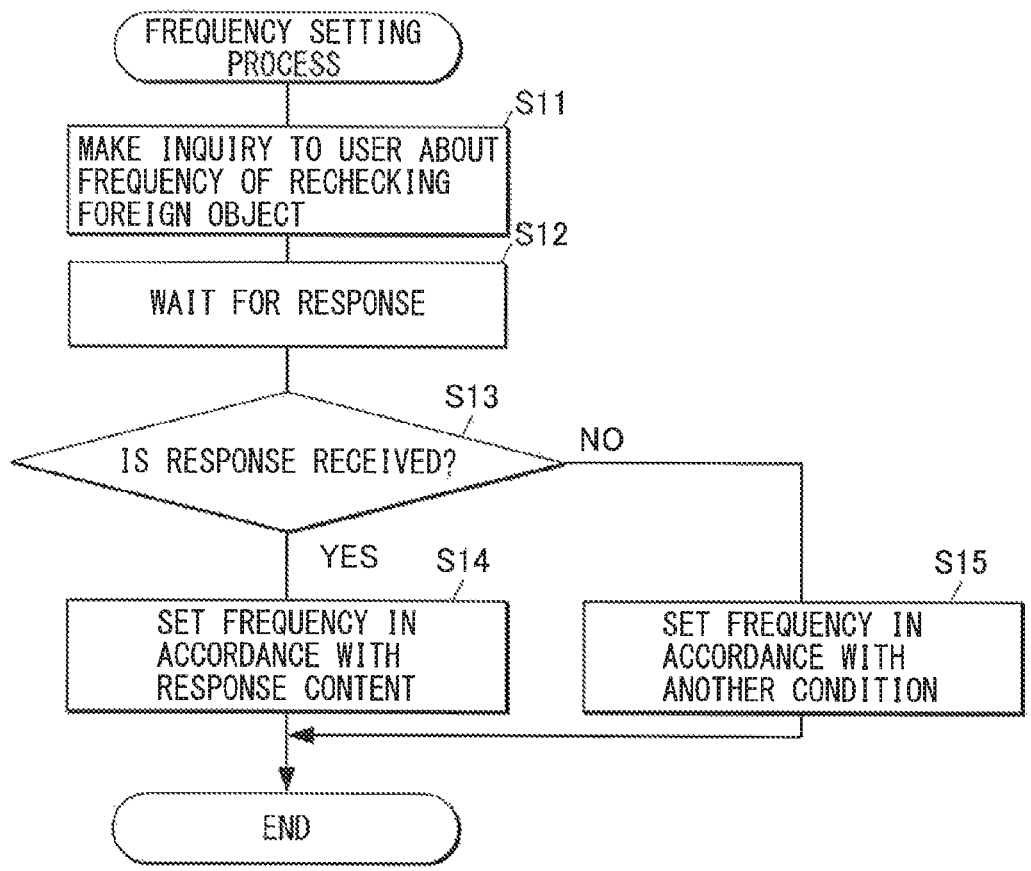
FIG. 5 is a flowchart illustrating a third example of the frequency setting process illustrated in FIG. 2.

FIG. 5 is a flowchart illustrating a third example of the frequency setting process illustrated in FIG. 2. In the third example, the frequency control unit 34*b* may set the frequency on the basis of a request from the user. Non-limiting examples of the request from the user may include a request which the user has set in advance for the electric vehicle 1, and a request supplied by the user in response to each inquiry. The inquiry about the request may be made to a mobile terminal of the user via the telematics-service communication unit 39, for example. When the inquiry about the request is made, the user may be provided with a factor on the basis of which the user determines the request, for example. Non-limiting examples of the factor may include the state of the sub-battery 15, the remaining charged power amount of the main battery 11, and the type of the foreign object. Non-limiting examples of the state of the sub-battery 15 may include the remaining charged power amount, the voltage, or the SOH of the sub-battery 15.

When the frequency setting process J14 illustrated in FIG. 2 is started, the frequency control unit 34*b* may notify the mobile terminal of the user of detection of the foreign object and transmit data to make an inquiry about the frequency of determining whether the power transmission is restartable, i.e., a frequency of rechecking the presence of the foreign object (step S11). Thereafter, the frequency control unit 34*b* may wait for a response (step S12). If the response is received (YES in step S13), the frequency control unit 34*b* may set a frequency indicated by the user (step S14). If the response is not received (NO in step S13), the frequency control unit 34*b* may set a frequency decided on the basis of another condition (step S15).

The frequency setting process illustrated in FIG. 5 may be effective in a case where the user is skilled sufficiently to determine a situation appropriately. According to the frequency setting process illustrated in FIG. 5, the process of making the inquiry about the foreign object may be performed with a frequency based on a situation determined by the user. Therefore, even when the wireless charging is stopped due to entry of the foreign object, the determination as to whether the wireless charging is restartable is made in conformity with the request from the user, allowing for restart of the wireless charging with appropriate time lag in a case where the foreign object is removed.

Figure 6:
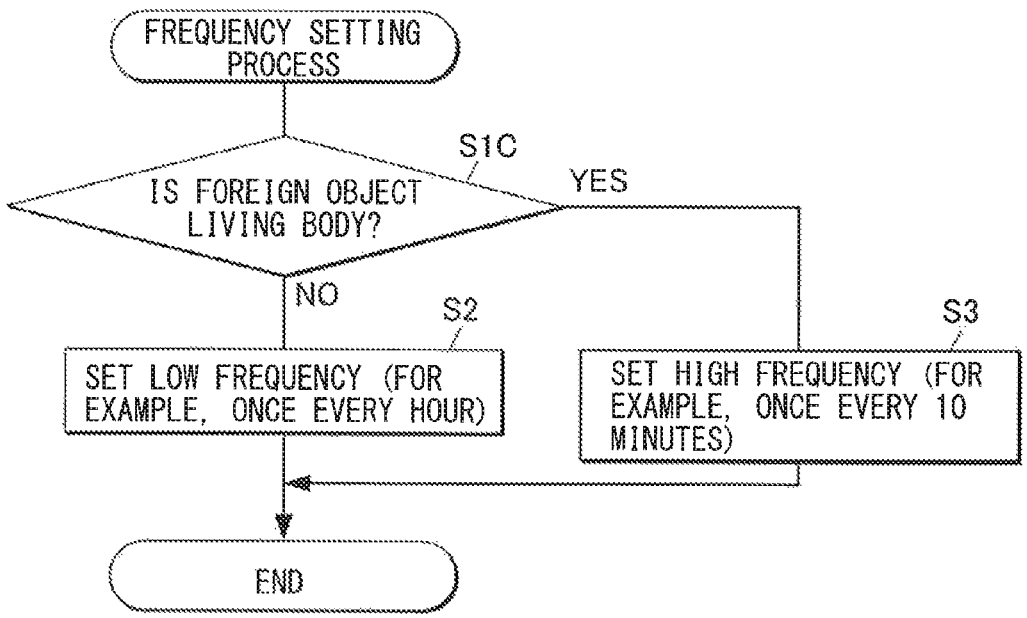
FIG. 6 is a flowchart illustrating a fourth example of the frequency setting process illustrated in FIG. 2.

FIG. 6 is a flowchart illustrating a fourth example of the frequency setting process illustrated in FIG. 2. In the fourth example, the frequency control unit 34*b* may set the frequency on the basis of the type of the foreign object. When the frequency setting process 114 in FIG. 2 is started, the frequency control unit 34*b* may determine whether the foreign object is a living body (step SIC). The determination of the type of the foreign object may be performed by the foreign-object detection processor 105*a* of the ground equipment 100. The charge controller 34 may recognize the type of the foreign object by receiving information regarding the type of the foreign object from the power-transmission controller 105 of the ground equipment 100. Instead of the foreign-object detection processor 105*a*, the foreign object detector 104 may determine the type of the foreign object in one example. When a result of the determination in step S1C is YES, the frequency control unit 34*b* may set the frequency to a high frequency (step S3), for example. Non-limiting examples of the high frequency may include a frequency of once every ten minutes. In contrast, when the foreign object is not a living body, i.e., when the result of the determination in step S1C is NO, the frequency control unit 34*b* may set the frequency to a low frequency (step S2), for example. Non-limiting examples of the low frequency may include a frequency of once every hour.

According to the frequency setting process illustrated in FIG. 6, the frequency of the foreign object rechecking process is allowed to be varied in accordance with whether the foreign object moves frequently. This allows for restart of the wireless charging that has been stopped due to entry of the foreign object while allowing for reduction of needless electric power consumption.

In a case where the wireless charging is stopped due to detection of the foreign object, stopping also of the system of the electric vehicle makes recognition by the system difficult. Therefore, even if the foreign object is removed thereafter, it may be difficult for the system to recognize the removal of the foreign object, preventing restart of the wireless charging. The passenger, including a driver who is a user and other passengers, may often leave the electric vehicle during the wireless charging. Therefore, if the wireless charging is stopped before the charging is completed, the passenger can find the main battery not charged much when he or she comes back to the electric vehicle. In another case where the wireless charging is stopped due to detection of the foreign object but wireless charging control operation continues thereafter, consumption of electric power by the control system continues although electric power feeding through the wireless charging is stopped. This can result in shortage of system power supply of the electric vehicle, for example, causing exhaustion of the electric power.

In addition, the electric vehicle may have various configurations such as a configuration in which electric power of the main battery that stores electric power for traveling is usable as electronic power supply of the control system, or a configuration in which exhaustion of electric power of the control system prevents restart of the electric vehicle even when some amount of the charged power of the main battery still remains. In addition, the wireless charging may be performed in various situations such as a situation where charging of the main battery has low priority, or a situation where the exhaustion of electric power of the control system is allowed to be dealt with immediately.

In view of such circumstances, it is desired to allow for appropriate control for various situations in a case where the wireless power transmission is stopped due to detection of a foreign object. Non-limiting examples of the various situations may include a situation where it is suitable to restart power transmission swiftly after removal of the foreign object, and a situation where it is suitable to suppress electric power consumption as much as possible during stopping of the power transmission.

According to the electric vehicle 1 of the first example embodiment, the determination processor 34*a* and the frequency control unit 34*b* may be provided. The determination processor 34*a* may determine whether the wireless charging is restartable as a result of removal of the foreign object. The frequency control unit 34*b* may change the frequency with which the determination processor 34*a* performs the determination process. This makes it possible, for example, in a case where the wireless charging is stopped due to detection of the foreign object but the foreign object is removed thereafter, to use the determination of the removal of the foreign object made by the determination processor 34a as a trigger to restart the wireless charging. The determination process performed by the determination processor 34a consumes electric power; however, changing of the frequency with which the determination processor 34a performs the determination process allows for adjustment of an amount of the electric power to be consumed in the determination process. This makes it possible to adjust operation of the control in accordance with various situations, for example, a situation where it is suitable to restart wireless charging swiftly after removal of the foreign object, or a situation where it is suitable to suppress electric power consumption as much as possible during stopping of the wireless charging.

Further, according to the electric vehicle 1 of the first example embodiment, the determination processor 34a may make an inquiry about the foreign object to the power-transmission controller 105 of the ground equipment 100, thereby determining whether the wireless charging is restartable. This allows for restart of the wireless charging on the basis of the response from the ground equipment 100 to the inquiry also in a case where the electric vehicle 1 does not include a foreign object detecting mechanism. In other words, not the ground equipment 100 but the electric vehicle 1 is allowed to lead the restart of the wireless charging. The electric vehicle 1 is more preferable than the ground equipment 100 to lead the restart of the wireless charging, because management of the wireless charging, e.g., management of charged power or any other management, may be performed on the basis of the state of the main battery 11. In addition, the above-described configuration makes it unnecessary for the electric vehicle 1 to include the foreign object detecting mechanism, making it possible to reduce cost of the electric vehicle 1.

Second Example Embodiment

The electric vehicle 1 according to a second example embodiment may further include a foreign object detector 38 in addition to the components included in the electric vehicle 1 according to the first example embodiment. The foreign object detector 38 is indicated by a dashed line in FIG. 1. The foreign object detector 38 may include, for example but not limited to, an imaging unit that captures an image below the power receiver 31 and a functional module that performs image recognition based on the captured image. The foreign object detector 38 is not limited the configuration described above. The foreign object detector 38 may have any of various configurations such as a configuration of detecting a foreign object by means of radar, for example, ultrasonic radar or optical radar.

In the electric vehicle 1 according to the second example embodiment, the determination processor 34a may drive the foreign object detector 38, instead of making an inquiry about a foreign object from the electric vehicle 1 to the ground equipment 100, that is, making the inquiry from the determination processor 34a to the power-transmission controller 105, thereby determining whether the power transmission is restartable as a result of removal of the foreign object. The foreign object detector 38 may be driven with electric power of the sub-battery 15. Therefore, frequently repeating the determination process may result in reduction of the state of charge of the sub-battery 15, causing shortage of electric power, e.g., exhaustion of the electric power.

The frequency control unit 34b may set a frequency with which the determination processor 34a performs the determination process using the foreign object detector 38 in accordance with various situations in ways similar to those in the first example embodiment.

Other components and processes may be similar to those of the first example embodiment.

According to the electric vehicle 1 of the second example embodiment, the determination processor 34a may use the foreign object detector 38 to determine whether the foreign object is removed, thereby determining whether the wireless charging is restartable. This allows for temporary blocking of communication between the electric vehicle 1 and the ground equipment 100 while the wireless charging is stopped. This makes it possible to further reduce electric power consumption in an interval between the determination processes.

Some example embodiments of the technology have been described above; however, the embodiment of the technology is not limited thereto. For example, in the example embodiments described above, the frequency may be switched between two levels in the frequency setting process. In another example embodiment, however, the frequency may be switched between three or more levels. In still another example embodiment, the frequency may be switched on the basis of a combination of any two or more of the frequency switching conditions described in FIGS. 3 to 6. Further, according to the example embodiments described above, the frequency setting process may be performed only once after the notification indicating the presence of the foreign object. In another example embodiment, however, the frequency setting process may be also performed while the process of checking whether the foreign object is removed is repeated, to update the frequency of the checking process. Any other details described above referring to the example embodiments may be modified appropriately without departing from the gist of the technology.

Each of the charge controller 34, the determination processor 34a, the frequency control unit 34b, the power-transmission controller 105, and the foreign-object detection processor 105a illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the charge controller 34, the determination processor 34a, the frequency control unit 34b, the power-transmission controller 105, and the foreign-object detection processor 105a illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the charge controller 34, the determination processor 34a, the frequency control unit 34b, the power-transmission controller 105, and the foreign-object detection processor 105a illustrated in FIG. 1.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

What is claimed is:

1. An electric vehicle comprising:
a power receiver configured to wirelessly receive electric power from power transmission equipment disposed outside the vehicle; and
a controller configured to control power transmission from the power transmission equipment to the power receiver,
the controller including
a determination processor configured to make a determination, in a case where the power transmission is stopped due to a foreign object present between the power transmission equipment and the vehicle, as to whether the power transmission is restartable with a predetermined frequency after the power transmission is stopped, and
a frequency control unit configured to change the predetermined frequency with which the determination processor makes the determination.

2. The electric vehicle according to claim 1, further comprising a battery configured to be charged with the electric power received from the power transmission equipment.

3. The electric vehicle according to claim 2, further comprising
a communication unit configured to communicate with the power transmission equipment, wherein
the controller is configured to control the power transmission on a basis of information acquired via the communication unit.

4. The electric vehicle according to claim 3, further comprising
a sub-battery configured to output a voltage lower than a voltage of the battery, wherein
the frequency control unit is configured to change the predetermined frequency on a basis of a state of the sub-battery.

5. The electric vehicle according to claim 3, wherein the frequency control unit is configured to change the predetermined frequency on a basis of a total remaining electric power amount of the vehicle, the total remaining electric power amount including a remaining electric power amount of the battery.

6. The electric vehicle according to claim 4, wherein the frequency control unit is configured to change the predetermined frequency on a basis of a total remaining electric power amount of the vehicle, the total remaining electric power amount including a remaining electric power amount of the battery.

7. The electric vehicle according to claim 3, further comprising
a request input unit configured to receive a request from a user, wherein
the frequency control unit is configured to change the predetermined frequency on a basis of the request from the user received via the request input unit.

8. The electric vehicle according to claim 4, further comprising
a request input unit configured to receive a request from a user, wherein
the frequency control unit is configured to change the predetermined frequency on a basis of the request from the user received via the request input unit.

9. The electric vehicle according to claim 3, further comprising
a type determination unit configured to determine a type of the foreign object, wherein
the frequency control unit is configured to change the predetermined frequency on a basis of the type of the foreign object determined by the type determination unit.

10. The electric vehicle according to claim 4, further comprising
a type determination unit configured to determine a type of the foreign object, wherein
the frequency control unit is configured to change the predetermined frequency on a basis of the type of the foreign object determined by the type determination unit.

11. The electric vehicle according to claim 3, wherein the determination processor is configured to make an inquiry to the power transmission equipment via the communication unit, and determine whether the power transmission is restartable, on a basis of a response from the power transmission equipment to the inquiry.

12. The electric vehicle according to claim 4, wherein the determination processor is configured to make an inquiry to the power transmission equipment via the communication unit, and determine whether the power transmission is restartable, on a basis of a response from the power transmission equipment to the inquiry.

13. The electric vehicle according to claim 3, further comprising
a foreign object detector configured to perform detection of presence of the foreign object, wherein
the determination processor is configured to determine whether the power transmission is restartable, on a basis of a result of the detection performed by the foreign object detector.

14. The electric vehicle according to claim 4, further comprising
a foreign object detector configured to perform detection of presence of the foreign object, wherein
the determination processor is configured to determine whether the power transmission is restartable, on a basis of a result of the detection performed by the foreign object detector.

15. The electric vehicle according to claim 2, further comprising
an electric motor for traveling, wherein
the battery is configured to feed electric power to the electric motor.

16. The electric vehicle according to claim 3, further comprising
an electric motor for traveling, wherein
the battery is configured to feed electric power to the electric motor.

17. The electric vehicle according to claim 4, further comprising
an electric motor for traveling, wherein
the battery is configured to feed electric power to the electric motor.

18. A charge control apparatus for an electric vehicle, the charge control apparatus comprising:
a power receiver configured to wirelessly receive electric power from a power transmission equipment disposed outside the vehicle, the power receiver being configured to charge a battery with the received electric power; and circuitry configured to
- control power transmission from the power transmission equipment to the power receiver,
- make a determination, in a case where the power transmission is stopped due to a foreign object present between the power transmission equipment and the vehicle, as to whether the power transmission is restartable with a predetermined frequency after the power transmission is stopped, and
- change the predetermined frequency of making the determination.

* * * * *